United States Patent
Mitchell

[15] 3,649,239
[45] Mar. 14, 1972

[54] LIQUID FERTILIZER COMPOSITIONS

[72] Inventor: Allen F. Mitchell, Wanganui, New Zealand

[73] Assignee: Galdonost Dynamics (N.Z.) Limited, Wanganui, New Zealand

[22] Filed: July 23, 1969

[21] Appl. No.: 844,192

[30] Foreign Application Priority Data

July 24, 1968 New Zealand..........................153,269

[52] U.S. Cl..........................................71/23, 71/33, 71/28, 71/63, 47/DIG. 10
[51] Int. Cl.......................................C05f 11/00, A01g 7/00
[58] Field of Search......................47/DIG. 4, DIG. 10, 9, 58; 71/11, 23, 63, 24, 27, 28, 33; 260/209.6

[56] References Cited

UNITED STATES PATENTS

| | | | |
|---|---|---|---|
| 3,099,896 | 8/1963 | Kurth | 71/27 |
| 3,307,293 | 3/1967 | Truax | 47/9 |

FOREIGN PATENTS OR APPLICATIONS 641,280  8/1950  Great Britain

*Primary Examiner*—Reuben Friedman
*Assistant Examiner*—Charles N. Hart
*Attorney*—Holman & Stern

[57] ABSTRACT

Fertilizer compositions are prepared from a solution of a soluble alginate and soluble fertilizer chemicals and/or insoluble fertilizer chemicals in emulsion form. Such compositions rely on the gelling action of alginic acid; the gel when formed holds the fertilizer chemicals inside its mass and releases them slowly to the soil.

15 Claims, No Drawings

LIQUID FERTILIZER COMPOSITIONS

This invention relates to fertilizer compositions in which active fertilizer compounds are incorporated in a carrier material; and a method for producing such fertilizer compositions; and a method for using the fertilizer compositions in a locus.

Fertilizer compositions applied to the soil to assist plant growth are often wasted to a considerable and costly extent due to leaching of the compositions by rain or surface water directly through the soil without being able to be absorbed by the plant roots. This problem is especially prevalent with the very soluble potassium and nitrogen compounds used particularly in the horticultural industry. It would be of considerable advantage if such soluble compounds could be held in the soil and not be leached by rain and at the same time be available to plants.

It is an object of this invention to provide an improved carrier for fertilizer materials such as water soluble phosphorus, nitrogen and potassium compounds whereby when the fertilizer in conjunction with the carrier is applied to the soil, the fertilizer materials are retained by the carrier to a substantial degree so that the rate of release of the water soluble compounds from the carrier to the soil is reduced.

It is another object of this invention to provide a fertilizer composition, such that the rate of release of soluble compounds out of the composition can be controlled either by altering the properties of the fertilizer composition or by subsequent treatment of the fertilizer composition after it has been applied to the soil.

It is a further method of this invention to provide a simple method for the preparation of the fertilizer composition.

It is a further object of this invention to provide a fertilizer composition which can be varied to suit different soil types.

These objects will become apparent from the following description of the invention.

According to this invention there is provided a liquid fertilizer composition comprising fertilizer chemicals dissolved or dispersed in an aqueous aliginic acid/alginate system at a pH of from about 4.2 to about 8.

Alginic acid, a polymer of d-mannuronic acid, may be reacted with alkali metal hydroxides or carbonates to yield a water soluble salt such as potassium alginate. In this specification and claims an alkali metal includes ammonium.

Such water soluble salts can be dissolved in water to yield a solution to which can then be added soluble fertilizer chemicals such as potassium, nitrogen, and/or phosphorous salts and/or insoluble fertilizer chemicals in emulsion or suspension form. The solution and/or emulsion thus obtained can then be used as a liquid fertilizer to be applied in any conventional manner. Further according to this invention there is provided a process for promoting the growth of plants comprising applying a liquid fertilizer composition which comprises fertilizer chemicals dissolved or dispersed in an aqueous alginic acid/alginate system at a pH of from about 4.2 to about 8.

Alginic acid is obtained generally from seaweeds of certain species by a complicated and expensive process and in the compositions of this invention it is not necessary to employ pure alginic acid but one can start directly with impure alkali metal alginates as a solution in the compositions of this invention. However even such impure alginates also are relatively uneconomic to employ and it is possible to employ alginates derived directly from seaweed to produce a fertilizer composition containing soluble alginates.

The seaweeds to be employed must yield alginic acid or its salts on treatment, such as seaweeds of the *macrocystis, durvillea* and *laminaria* species.

A fertilizer composition thus may be prepared by subjecting a seaweed of the above type to a treatment with an alkali metal carbonate or hydroxide until the alginic acid is released from the seaweed and combines with the alkali metal carbonates to form a soluble alkali metal alginate in solution and adding conventional fertilizer chemicals and additionally adding an acidic material to adjust the pH of the composition to between about 4.2 and about 8.

The alkali metal carbonate or hydroxide is preferably potassium carbonate as this provides for the potassium factor in the fertilizer compositions. Further fertilizer compounds may be added including a nitrogen factor in any suitable form such as urea and a phosphorous factor such as phosphoric acid and any additional potassium factor and other fertilizer materials as desired.

In the following description, by way of example, the invention will be described by reference to potassium alginate, but it will be realized by those skilled in the art that any other alkali metal alginate will produce the same salt.

In the alkaline state the potassium alginate is found to be stable. By "stable" is meant that there is little or no hydrolysis of the alginate anion occurring.

It has now surprisingly been found that when another acid in solution having a pH value lower than the pH value of the alginate solution, especially an acid solution having a pH value of less than 4.2 is added to a solution of the potassium alginate at an alkaline pH, then the stronger acid suppresses the ionization of the alginate anion and the alginic acid thus formed gels and, at the same, time, includes within its mass the newly formed potassium salt of the stronger acid and tends to retain this salt until the pH of the solution is returned to an alkaline pH.

It has further surprisingly been found that if soluble compounds such as soluble phosphorous and nitrogen compounds are present in the potassium alginate solution then when the stronger acid is added and the alginic acid gels, these other soluble compounds tend to be retained within the gel and also tend to be retained until the pH of the solution is adjusted to an alkaline value. The acidic material is in turn also preferably phosphoric acid.

Thus in accordance with this invention the fertilizer composition is added to soil at a pH depending on the pH of the soil. If the soil is acidic then the pH of the composition is adjusted to the alkaline level between 7 and 8 i.e., the solution is a true solution and will be slightly viscous in nature. Then the acids in the soil react with the potassium alginate to produce alginic acid which gels and thus tends to retain the fertilizer compounds and prevents these compounds from being released into the soil all at the time time at the first fall of rain. If the soil is in the highly alkaline state i.e., from about pH 8–9 then it is preferable to add the composition at a pH in the acidic range between 4.2 and 7 i.e., the composition is already in the form of a gel, and the alkalinity of the soil raises the pH of the composition, and this the fertilizer chemicals will be slowly released.

The retention property of alginic acid gel (herein referred to as "gel") for other chemicals depends on the pH value. At a pH of greater than 8, the materials present in the solution are soluble and little advantage will be obtained on application to the soil as the materials will disappear into the soil by leaching and even disadvantages will occur due to the damaging of the plants by the strong alkaline solution coming into contact with them.

At a pH value of less than 4.2 the alginate anion is converted almost entirely to the acid and is present almost in a solid form, and so there is very little or no release of chemicals from the gel.

In between the ranges from pH 4.2 to 8, especially at a pH of between 6.5 to 7.5 the retention properties of the gel becomes of most importance in accordance with this invention. In deriving the greatest benefit from the soil and plant growth from the gel, it is necessary for the fertilizer materials to be given up slowly by the gel. It has been found that the retention properties of the gel vary progressively from the near solution at pH 8 when the fertilizer materials can transfer almost directly to the soil to the almost plastic material at 4.2 when the fertilizer materials are retained almost completely by the gel.

Even with acidic soil, e.g., at a pH OF 4.2 it has been found that the concentration of soil chemicals will be small compared to the concentration of chemicals in the fertilizer. So that the rate at which the pH of the fertilizer composition, decreases will be slow. This rate can be further deceased by the addition of buffering compounds to the fertilizer composition. These buffers which can be added must have a buffering action in the range of pH 4.2 to 8 and the most preferred buffers are the salts of phosphoric acid; especially at a pH 8-dipotassium hydrogen phosphate and at the acid end-potassium dihydrogen phosphate.

In the preferred method according to this invention the alkali metal alginate obtained from the treatment of seaweed described above has an alkali metal hydroxide or carbonate, preferably potassium hydroxide, added to it to increase the pH and maintain the alginate in a soluble form. To this solution is added phosphoric acid until the desired pH level is reached. This if the desired pH level is pH of 8 say the final phosphate salt present in the solution will be di-potassium hydrogen phosphate. If it is desired to have a lower pH level, such as for alkaline soils then phosphoric acid will be added until a pH of between 4.2 and 4.4 is reached when the buffering salts will be potassium dihydrogen phosphate. These two salts of potassium and phosphoric acid will thus buffer the composition in the desired range. The amount of buffering phosphate present is adjusted to suit soil types. If the soil is very acidic down to a pH of 4.2 then it is desirable to have a substantial amount of buffering dipotassium hydrogen phosphate present in order to hold the composition pH in the most preferred range of between 6.5 and 7.5. however if the soil has a pH of towards 6-7 then the amount of buffering needed to hold the composition in the desired pH range will be reduced accordingly. Similarly with a highly alkaline solution a considerable amount of potassium dihydrogen phosphate will be present to hold the gel in the acidic range. With the slightly alkaline to neutral soil types the composition can be buffered at a higher pH level i.e., towards 6–7.

By way of example the changes occuring on application of a fertilizer composition to a fairly acidic soil can be explained as follows:

On application the fertilizer composition is in solution at a pH of 8 say, so that the rate of release of the fertilizer chemicals from the composition to the soil is rapid thus resulting in immediate benefit to the plant. However as the soil react with the alkaline materials such as $K_2HOP_4$ $K_3PO_4$ and KOH the pH of the composition will fall. When the pH of 7.5 is reached the alginic acid form starts to gel and the aforesaid rate of release of the fertilizer chemicals is reduced accordingly, and as the pH continues to fall the gelling action of the alginic acid continues to develop further and rate of release of the fertilizer chemicals is decreased further. So that in effect the fertilizer chemicals become available to plants over long periods of time such that initially the plants receive a substantial supply of the fertilizer chemicals which will give a considerable boost to their growth, and this growth will be maintained by the succeeding but diminishing supply of the fertilizer chemicals.

In practice it is sometimes found that the pH of the composition does not fall in the above gradual manner but fluctuates between pH levels depending on climatic conditions and in this case it may be that the gel fluctuates between a level whereby the fertilizer chemicals are retained in one level and released in the second level.

With highly alkaline soils when the fertilizer composition is added at an acidic pH the above process will be reversed accordingly. Thus as the pH of the composition is raised by reaction with the soil chemicals the fertilizer chemicals will be released at an ever increasing rate.

This invention further provides methods of altering the above gelling factors after application of the fertilizer composition to the soil. If it is found after application to the soil that beneficial effects are not apparent then the rate of release of the fertilizer chemicals from the gel is too slow. Then in this case, the invention provides for the application of an alkaline substance such as sodium or potassium carbonate over the already applied fertilizer composition which will raise the pH of the composition to a level depending on the amount of sodium or potassium carbonate applied such as to a pH of 8 when the fertilizer chemicals can be released rapidly into the soil, thus providing for a quick boost to the plants growth. On the other hand it may be necessary in some cases to increase the rate of gel formation and it has now surprisingly been found that heavy metal salts catalyse the formation of a gel. These heavy metal salts are those below and including calcium on the electro-chemical scale, but also including barium. The ions of the higher metals such as calcium and barium for a gel of viscous nature but the ions of the lower metals such as lead form a more solid precipitate which is of a fibrous almost papery nature. It is not properly understood how the heavier metals catalyze the formation of the gel; it is thought that these may form a simple salt precipitate of the heavy metal with the alginate. However the heavier metals may at lower concentrations merely act as a catalyst.

If for example a drop of lead nitrate solution is added into 10 ml. of a solution of the fertilizer composition at a pH of 8 a white precipitate of lead alginate is immediately formed, which forms a white flocculency.

Heavy metal ions especially calcium as well as heavier metals in the form of trace elements are present in all soils so that these heavy metal ions will aid the stability of the gel over and above the stability of the gel brought about by the buffering agents present. If it is found with some soils that the gel is not very stable that it is tends to change too rapidly towards the alkaline state and thus become soluble, then this invention further provides that a low concentration solution of heavy metal salts in particular solutions of calcium salts may be applied to the soil shortly after the fertilizer composition has been applied whereby the gelling stage will be stabilized When it is desired to add trace elements to the soil such as cobalt then these can be added to the fertilizer composition in an insoluble form before application to the soil to form an emulsion or suspension of trace element in the fertilizer composition. However, one may also add soluble salts of the trace elements so long as the anionic part of the salt is an anion of a weaker acid than alginic acid; such a salt does not tend to cause excessive formation of the gel. Also as the trace elements are only added in very minute amounts heavy metal salts of strong acids may be added in amounts which again do not cause excessive formation of the gel before application to the soil as for example an alginic acid get of a pH of 4.2 leads to difficulties of application.

From the above description it will thus be realized that it is desirable to maintain the get between a pH of 6.5 and 7.5 and from a knowledge of the pH of the particular soil in question one can choose a particular PH of the fertilizer composition to be applied. If one finds that the gel applied is not releasing the fertilizer chemicals at a sufficient rate then one will further apply an alkaline material to increase the pH of the gel to a satisfactory degree but on the other hand if one finds that the gel is releasing the chemicals at too rapid a rate then one will apply a solution of a heavy metal salt in order to increase the gel formation and thus slow down the release of chemicals.

The alginic acid gel is found to be broken down by soil bacteria which ensures that there is no build up in the soil of a gel of a permanent nature.

In accordance with this invention then the gelling action of alginic acid is used to retain fertilizers inside the gel. The type of chemicals which can be incorporated and the amount of chemicals retained by the gel are considerable; the only provision is that these chemicals are compatible one with each other and are of course not injurious to plants. The amount of alginate solution for use in preparing the fertilizer composition can vary from dilute solutions up to nearly saturated solutions. In order to obtain the utmost benefit from the fertilizer composition it is desirable to have as concentrated an alginate solution as possible which in turn leads to the retention of the solution for fertilizer chemicals being at its highest while at the same time it is desirable to have as dilute an alginate solution as possible which permits a greater amount of fertilizer chemicals to be dissolved in the alginate solution and also with less difficulty then the more viscous solution at higher concentrations. The preferred concentration of the alginate solution is between about 0.6 percent and 1.0/by weight. If, after a fertilizer composition according to the invention has been prepared, it is desired to dilute the fertilizer chemicals within the solution, then such dilution is preferably carried out by adding an alginate solution to the fertilizer composition of the same concentration as that employed in the preparation of the fertilizer composition itself.

Merely by way of example the following specific examples of formulations prepared in accordance with this invention are provided. These are not meant to be limitative to any degree.

In the following examples the phosphoric acid employed was 80 percent strength having a specific gravity of 1.6. The potassium hydroxide is 83–86 percent strength. The alginate employed was potassium.

All parts and percentages are by weight.

Example 1
N:P:K of 10:3:5

| Substance | Parts |
|---|---|
| Urea | 1071.71 |
| $H_3PO_4$ | 474.563 |
| KOH | 450.000 |
| Alginure (an impure extract from seaweed containing alginates) | 500 |
| Water | 2500 |
| pH of the composition was | 8 |

Example 2
N:P:K of 10:3:5

| Substance | Parts |
|---|---|
| Urea | 1071.7 |
| $H_3PO_4$ | 474.563 |
| KOH | 450 |
| Alginate | 50 |
| Water | 2952.735 |
| The pH of the composition was | 8 |

Example 3
N:P:K of 10:5:5

| Substance | Parts |
|---|---|
| Urea | 10.717 |
| $H_3PO_4$ | 4.938 |
| KOH | 3.602 |
| Alginate | 0.2792 |
| Water | 27.29 |
| The pH of the composition was | 5.8 |

Example 4
N:P:K of 10:3.960:5

| Substance | Parts |
|---|---|
| Urea | 21.4362 |
| $H_3PO_4$ | 12.5279 |
| KOH | 7.1746 |
| Alginate | 0.588 |
| Water | 58.2734 |
| The pH of the composition was | 4.4 |

Example 5
N:P:K of 10:4:6

| Substance | Parts |
|---|---|
| Urea | 21.4362 |
| $H_3PO_4$ | 12.6542 |
| KOH | 8.6253 |
| Alginate | 0.572 |
| Water | 56.7123 |
| The pH of the composition was | 7 |

Example 6
N:P:K of 8:6:8

| Substance | Parts |
|---|---|
| Urea | 17.149 |
| $H_3PO_4$ | 18.981 |
| KOH | 12.914 |
| Alginate | 0.509 |
| Water | 60.447 |
| pH of the composition was | 6.9 to 7.0 |

Example 7
N:P:K of 10:3:5

| Substance | Parts |
|---|---|
| Urea | 21.4362 |
| $H_3PO_4$ | 9.807 |
| KOH | 4.1746 |
| Alginate | 0.615 |
| Water | 60.9672 |
| pH of the composition was | 7 |

Example 8
N:P:K of 7:4:11

| Substance | Parts |
|---|---|
| Urea | 11.9108 |
| $KNO_3$ | 10.3439 |
| $H_3PO_4$ | 12.6542 |
| KOH | 10.0444 |
| Alginate | 0.5504 |
| Water | 54.4963 |
| pH of the composition was | 7 |

I claim:

1. A liquid fertilizer composition consisting essentially of an aqueous alginic acid/alginate system having dispersed or dissolved therein fertilizer chemicals and a buffering agent, said buffering agent being present in an amount sufficient to buffer said system to a pH of between about 4.2 and about 8.

2. A fertilizer composition as claimed in claim 1 where the buffering agent is di-potassium hydrogen phosphate/potassium di-hydrogen phosphate.

3. A fertilizer composition as claimed in claim 1 wherein the pH of the composition is between 7 and 8.

4. A liquid fertilizer composition as claimed in claim 1 wherein said system is buffered to a pH of from 7 to 8 by the presence of di-potassium hydrogen phosphate.

5. A process for promoting the growth of plants comprising applying a fertilizer composition as claimed in claim 1 to the locus of the plant.

6. A process as claimed in claim 5 wherein the pH of the composition is selected to suit soil types.

7. A process as claimed in claim 6 comprising applying a fertilizer composition having pH between 7 and 8 to an acidic soil.

8. A process as claimed in claim 6 comprising adding a fertilizer composition having a pH in the range 4.2 to 7 to an alkaline soil.

9. A process as claimed in claim 7 wherein the composition additionally contains a buffering agent which buffers the composition in the pH range of 7 to 8.

10. A process as claimed in claim 8 where the composition additionally contains a buffering agent which buffers the composition in the range of pH 4.2 to 7.

11. A process as claimed in claim 9 where the buffering agent is di-potassium hydrogen phosphate.

12. A process as claimed in claim 10 wherein the buffering agent is potassium di-hydrogen phosphate.

13. A process for promoting the growth of plants comprising applying to the locus of the plants, a composition as claimed in claim 1 and applying thereafter, a heavy metal salt to increase the rate of formation of the alginic acid gel or applying thereafter an alkaline material to raise the pH of the composition.

14. A process as claimed in claim 13 wherein the alkaline material is sodium or potassium carbonate.

15. A process as claimed in claim 7 wherein the heavy metal is calcium.

* * * * *